(12) United States Patent
Kobayashi et al.

(10) Patent No.: US 8,725,554 B2
(45) Date of Patent: May 13, 2014

(54) HOUSEHOLD MEMBER NUMBER DISTRIBUTION ESTIMATION APPARATUS AND HOUSEHOLD MEMBER NUMBER DISTRIBUTION ESTIMATION METHOD

(75) Inventors: Motonari Kobayashi, Chiyoda-ku (JP); Ichiro Okajima, Chiyoda-ku (JP); Tomohiro Nagata, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 42 days.

(21) Appl. No.: 13/394,945

(22) PCT Filed: Sep. 3, 2010

(86) PCT No.: PCT/JP2010/065126
§ 371 (c)(1),
(2), (4) Date: Mar. 8, 2012

(87) PCT Pub. No.: WO2011/033952
PCT Pub. Date: Mar. 24, 2011

(65) Prior Publication Data
US 2012/0185299 A1    Jul. 19, 2012

(30) Foreign Application Priority Data
Sep. 15, 2009    (JP) ................................. 2009-213554

(51) Int. Cl.
*G06Q 10/00*    (2012.01)
(52) U.S. Cl.
USPC ........................................ 705/7.34; 705/7.33
(58) Field of Classification Search
CPC ....................... G06Q 30/0201; G06Q 30/0205
USPC ................................................ 705/7.33, 7.34
See application file for complete search history.

(56) References Cited

U.S. PATENT DOCUMENTS

2002/0027975 A1* 3/2002 Oxley .............................. 379/45
2002/0198760 A1* 12/2002 Carpenter et al. .............. 705/10
(Continued)

FOREIGN PATENT DOCUMENTS

WO    2005 038680    4/2005

OTHER PUBLICATIONS

International Search Report Issued Nov. 16, 2010 in PCT/JP10/65126 Filed Sep. 3, 2010.

(Continued)

*Primary Examiner* — Thomas L Mansfield Jr.
(74) *Attorney, Agent, or Firm* — Oblon, Spivak, McClelland, Maier & Neustadt, L.L.P.

(57) ABSTRACT

A household member number distribution estimation apparatus of the present invention includes a subscriber information acquisition unit that acquires subscriber information that is information regarding subscribers of mobile terminals of a specific carrier in a region within a predetermined range and with which user IDs and main line numbers of the mobile terminals are associated, a household terminal number extraction unit that, by referring to the subscriber information, extracts the number of household terminals that is the number of the mobile terminals for each main line number, a household number extraction unit that extracts the number of households per number of terminals, and a household number estimation unit that, by using a terminal subscription rate in the region within the predetermined range to correct the number of households per number of terminals, estimates the number of households per number of household members that is the number of households for each of the number of household members constituting a household. Thus, the household member number distribution estimation apparatus enables to obtain the number of households for each of the number of household members with high accuracy on the basis of easily obtainable data.

12 Claims, 15 Drawing Sheets

(56) References Cited

U.S. PATENT DOCUMENTS

| | | | |
|---|---|---|---|
| 2007/0011040 A1* | 1/2007 | Wright et al. | 705/10 |
| 2007/0042770 A1* | 2/2007 | Yasui et al. | 455/428 |
| 2008/0301727 A1* | 12/2008 | Cristofalo et al. | 725/35 |
| 2009/0138593 A1* | 5/2009 | Kalavade | 709/224 |

OTHER PUBLICATIONS

International Preliminary Report on Patentability and Written Opinion issued Apr. 19, 2012 in patent application No. PCT/JP2010/065126 filed Sep. 3, 2010.

* cited by examiner

| MAIN LINE NUMBER | NUMBER OF HOUSEHOLD TERMINALS |
|---|---|
| 1 | 2 |
| 3 | 1 |
| 4 | 1 |
| ⋮ | ⋮ |

T1

(b)

| NUMBER OF HOUSEHOLD TERMINALS | NUMBER OF HOUSEHOLDS PER NUMBER OF TERMINALS |
|---|---|
| 1 | 2 |
| 2 | 1 |
| ⋮ | ⋮ |

T2

(c)

| NUMBER OF HOUSEHOLD MEMBERS | NUMBER OF HOUSEHOLDS PER NUMBER OF HOUSEHOLD MEMBERS |
|---|---|
| 1 | 1 |
| 2 | 2 |
| ⋮ | ⋮ |

| MAIN LINE NUMBER | NUMBER OF HOUSEHOLD TERMINALS |
|---|---|
| 1 | 2 |
| 3 | 1 |
| 4 | 1 |
| ⋮ | ⋮ |

T4

(b)

| USER ID | LINE NUMBER | MAIN LINE NUMBER | LATITUDE | LONGITUDE | NUMBER OF HOUSEHOLD TERMINALS |
|---|---|---|---|---|---|
| A | 1 | 1 | $Y_A$ | $X_A$ | 2 |
| B | 2 | 1 | $Y_B$ | $X_B$ | 2 |
| C | 3 | 3 | $Y_C$ | $X_C$ | 1 |
| D | 4 | 4 | $Y_D$ | $X_D$ | 1 |
| ⋮ | ⋮ | ⋮ | ⋮ | ⋮ | ⋮ |

Y3

(c)

| USER ID | LINE NUMBER | MAIN LINE NUMBER | LATITUDE | LONGITUDE | NUMBER OF HOUSEHOLD TERMINALS |
|---|---|---|---|---|---|
| A | 1 | 1 | $Y_A$ | $X_A$ | 2 |
| C | 3 | 3 | $Y_C$ | $X_C$ | 1 |
| D | 4 | 4 | $Y_D$ | $X_D$ | 1 |
| ⋮ | ⋮ | ⋮ | ⋮ | ⋮ | ⋮ |

Y4

(d)

| NUMBER OF HOUSEHOLD TERMINALS | MAIN LINE NUMBER | NUMBER OF TARGET HOUSEHOLD TERMINALS | CORRECTED NUMBER OF TARGET HOUSEHOLDS | NUMBER OF HOUSEHOLDS PER NUMBER OF TERMINALS |
|---|---|---|---|---|
| 1 | 3 | 1 | 1 | 2 |
|   | 4 | 1 | 1 |   |
| 2 | 1 | 1 | 0.5 | 0.5 |
| ⋮ | ⋮ | ⋮ | ⋮ | ⋮ |

T5

(e)

| NUMBER OF HOUSEHOLD MEMBERS | NUMBER OF HOUSEHOLDS PER NUMBER OF HOUSEHOLD MEMBERS |
|---|---|
| 1 | 1 |
| 2 | 2 |
| 3 | 1 |
| ⋮ | ⋮ |

T6

| USER ID | LINE NUMBER | MAIN LINE NUMBER | AGE | SEX | OCCUPATION |
|---|---|---|---|---|---|
| A | 1 | 1 | 39 | MALE | COMPANY EMPLOYEE |
| B | 2 | 1 | 37 | FEMALE | HOMEMAKER |
| C | 3 | 3 | 28 | MALE | COMPANY EMPLOYEE |
| D | 4 | 4 | 45 | MALE | SELF-OWNED BUSINESS |
| ⋮ | ⋮ | ⋮ | ⋮ | ⋮ | ⋮ |

| USER ID | LINE NUMBER | MAIN LINE NUMBER | LATITUDE | LONGITUDE | AGE | SEX | OCCUPATION | NUMBER OF HOUSEHOLD TERMINALS |
|---|---|---|---|---|---|---|---|---|
| A | 1 | 1 | $Y_A$ | $X_A$ | 39 | MALE | COMPANY EMPLOYEE | 2 |
| B | 2 | 1 | $Y_B$ | $X_B$ | 37 | FEMALE | HOMEMAKER | 2 |
| C | 3 | 3 | $Y_C$ | $X_C$ | 28 | MALE | COMPANY EMPLOYEE | 1 |
| D | 4 | 4 | $Y_D$ | $X_D$ | 45 | MALE | SELF-OWNED BUSINESS | 1 |
| ⋮ | ⋮ | ⋮ | ⋮ | ⋮ | ⋮ | ⋮ | ⋮ | ⋮ |

(b)

Y7

| USER ID | LINE NUMBER | MAIN LINE NUMBER | LATITUDE | LONGITUDE | AGE | SEX | OCCUPATION | NUMBER OF HOUSEHOLD TERMINALS |
|---|---|---|---|---|---|---|---|---|
| A | 1 | 1 | $Y_A$ | $X_A$ | 39 | MALE | COMPANY EMPLOYEE | 2 |
| C | 3 | 3 | $Y_C$ | $X_C$ | 28 | MALE | COMPANY EMPLOYEE | 1 |
| D | 4 | 4 | $Y_D$ | $X_D$ | 45 | MALE | SELF-OWNED BUSINESS | 1 |
| ⋮ | ⋮ | ⋮ | ⋮ | ⋮ | ⋮ | ⋮ | ⋮ | ⋮ |

(c)

T7

| NUMBER OF HOUSEHOLD TERMINALS | NUMBER OF HOUSEHOLDS PER NUMBER OF TERMINALS |
|---|---|
| 1 | 2 |
| 2 | 1 |
| ⋮ | ⋮ |

(d)

T8

| NUMBER OF HOUSEHOLD MEMBERS | NUMBER OF HOUSEHOLDS PER NUMBER OF HOUSEHOLD MEMBERS |
|---|---|
| 1 | 1 |
| 2 | 2 |
| 3 | 1 |
| ⋮ | ⋮ |

HOUSEHOLD MEMBER NUMBER DISTRIBUTION ESTIMATION APPARATUS AND HOUSEHOLD MEMBER NUMBER DISTRIBUTION ESTIMATION METHOD

TECHNICAL FIELD

The present invention relates to a household member number distribution estimation apparatus and a household member number distribution estimation method.

BACKGROUND ART

In general, family structure of each family or population in a certain region is surveyed by a census and such, or surveyed by questionnaire and such with the number of household members included in the questions. In addition, a technique that, based on the number of cellular phones that belong to a specified region, calculates population in the region is known (for example, Patent Literature 1).

CITATION LIST

Patent Literature

[Patent Literature 1] Japanese Patent Application Laid-Open Publication No. 2003-122877

SUMMARY OF INVENTION

Technical Problem

Because a census requires many workers, it is very laborious, and thus it is impossible to conduct it frequently. Furthermore, for questionnaire and such, in addition to being laborious, it is difficult to collect answers from all of those targeted, and thus many errors are contained in the tabulated results. Because a technique described in the above-mentioned Patent Literature 1 merely provides the number of cellular phones that exist in a certain region, it is impossible to know a family structure including the number of household members and such.

Accordingly, the present invention, conceived to address these problems, has an objective to provide a household member number distribution estimation apparatus and a household member number distribution estimation method making it possible to obtain the number of households for each of the number of household members with high accuracy on the basis of easily obtainable data.

Solution to Problem

To solve the problems described above, a household member number distribution estimation apparatus of the present invention is an apparatus that estimates the number of households per number of household members that is the number of households for each of the number of household members constituting a household in a region within a predetermined range. The household member number distribution estimation apparatus includes subscriber information acquisition means for acquiring subscriber information that is information regarding subscribers of mobile terminals of a specific carrier in the region within the predetermined range and with which user IDs each of which is information for identifying a mobile terminal and household identifiers each of which is information for identifying a household to which a user of the mobile terminal belongs are associated; household terminal number extraction means for, by referring to the subscriber information acquired by the subscriber information acquisition means and counting the number of the user IDs with which the same household identifier is associated, extracting the number of household terminals that is the number of the mobile terminals belonging to the household for each of the household identifiers; household number extraction means for, by counting the number of the household identifiers for which the numbers of household terminals extracted by the household terminal number extraction means are the same, extracting the number of households per number of terminals that is the number of households for each of the number of household terminals; household number estimation means for, by using a terminal subscription rate that is a ratio of the number of the subscribers of the mobile terminals of the specific carrier to population in the region within the predetermined range to correct the number of households per number of terminals extracted by the household number extraction means, estimating the number of households per number of household members; and processing result output means for outputting the number of households per number of household members estimated by the household number estimation means.

In addition, to solve the problems described above, a household member number distribution estimation method of the present invention is a method for a household member number distribution estimation apparatus that estimates the number of households per number of household members that is the number of households for each of the number of household members constituting a household in a region within a predetermined range. The household member number distribution estimation method includes a subscriber information acquisition step of acquiring subscriber information that is information regarding subscribers of mobile terminals of a specific carrier in the region within the predetermined range and with which user IDs each of which is information for identifying a mobile terminal and household identifiers each of which is information for identifying a household to which a user of the mobile terminal belongs are associated; a household terminal number extraction step of, by referring to the subscriber information acquired at the subscriber information acquisition step and counting the number of the user IDs with which the same household identifier is associated, extracting the number of household terminals that is the number of the mobile terminals belonging to the household for each of the household identifiers; a household number extraction step of, by counting the number of the household identifiers for which the numbers of household terminals extracted at the household terminal number extraction step are the same, extracting the number of households per number of terminals that is the number of households for each of the number of household terminals; a household number estimation step of, by using a terminal subscription rate that is a ratio of the number of the subscribers of the mobile terminals of the specific carrier to population in the region within the predetermined range to correct the number of households per number of terminals extracted at the household number extraction step, estimating the number of households per number of household members; and a processing result output step of outputting the number of households per number of household members estimated at the household number estimation step.

In the household member number distribution estimation apparatus and the household member number distribution estimation method of the present invention, because distribution of the number of household members is estimated based on subscriber information that is subscriber information of subscribers of a specific carrier and includes information of households to which users belong, for the specific carrier, a particular burden such as data collection or research for the estimation does not arise. In addition, based on the subscriber information of the specific carrier, after the number of households for each of the number of household terminals is extracted to obtain the number of households for each of the number of household members included in the subscribers of the specific carrier, correction using the terminal subscription rate in a region within a predetermined range is performed to estimate the number of households per number of household members, whereby highly accurate household member number distribution in the region can be obtained.

In addition, the household member number distribution estimation apparatus of the present invention further includes population storage means for storing therein information regarding the population in the region within the predetermined range in advance, wherein the household number estimation means, based on the information regarding the population stored in the population storage means and the number of the subscribers of the mobile terminals that is included in the subscriber information acquired by the subscriber information acquisition means, calculates the terminal subscription rate. In this case, the terminal subscription rate being accurate is calculated.

In addition, in the household member number distribution estimation apparatus of the present invention, the household number estimation means, where the number of households per number of terminals is set as $x_j$ when the number of household terminals is set as j, the number of households per number of household members is set as $y_i$ when the number of household members is set as i, and the terminal subscription rate is set as P, by performing operation to obtain $y_i$ that satisfies the following formula (1) on the basis of $x_j$, $$x_j = \sum_{i=j}^{\infty} {}_iC_j P^j (1-P)^{i-j} y_i \qquad (1)$$

estimates the number of households per number of household members.

All of the people in a region within a predetermined range are not subscribers of mobile terminals of a specific carrier. In addition, all of the members included in a household in a region within a predetermined range are not always subscribers of a specific carrier. With the structure described above, an operation using the terminal subscription rate is performed to correct the number of households per number of terminals obtained from the subscriber information in a specific carrier to a value with consideration given to all members in the region within the predetermined range, whereby it is possible to obtain the number of households per number of household members with high accuracy.

In addition, in the household member number distribution estimation apparatus of the present invention, the household number estimation means, where a vector having the number of households per number of terminals $x_0, x_1, x_2, \ldots$ as its elements is set as X and a vector having the number of households per number of household members $y_0, y_1, y_2, \ldots$ as its elements is set as Y, when expressing the formula (1) by the following formula (2) using a matrix A, $$X = AY \qquad (2)$$

calculates an inverse matrix $A^{-1}$ of the matrix A and, by using the inverse matrix $A^{-1}$ calculated to perform an operation represented in the following formula (3), $$Y = A^{-1} X \qquad (3)$$

estimates the number of households per number of household members.

In this case, it becomes possible to obtain $y_i$ that satisfies the formula (1) on the basis of $x_j$ by a simple matrix operation.

In addition, in the household member number distribution estimation apparatus of the present invention, the household number estimation means, by performing an operation to obtain $y_i$ that minimizes the following formula (5) on the basis of $x_j$ by the least square method, $$\sum_{j=0}^{\infty} \left( x_j - \sum_{i=j}^{\infty} {}_iC_j P^j (1-P)^{i-j} y_i \right)^2 \qquad (5)$$

(condition: $y_i \geq 0$)

estimates the number of households per number of household members.

In this case, it becomes possible to obtain $y_i$ that satisfies the formula (1) on the basis of $x_j$ by a simple matrix operation using the least square method.

In addition, the household member number distribution estimation apparatus of the present invention further includes target subscriber extraction means, wherein the household terminal number extraction means, by referring to the subscriber information and counting the number of the user IDs with which the same household identifier is associated, extracts the number of household terminals for each of the household identifiers, and also stores therein the number of household terminals extracted in association with the household identifiers and the user IDs in the subscriber information; the target subscriber extraction means, from the subscriber information with which the number of household terminals is associated by the household terminal number extraction means, extracts the subscriber information of the mobile terminals that meet a predetermined subscriber extraction condition stored in advance; and the household number extraction means, by referring to the subscriber information extracted by the target subscriber extraction means and counting the number of household identifiers for which the numbers of household terminals extracted by the household terminal number extraction means are the same for each of the number of household terminals, extracts the number of households per number of terminals.

In addition, the household member number distribution estimation method of the present invention further includes a target subscriber extraction step, wherein the household terminal number extraction step includes, by referring to the subscriber information and counting the number of the user IDs with which the same household identifier is associated, extracting the number of household terminals for each of the household identifiers and also storing therein the number of household terminals extracted in association with the household identifiers and the user IDs in the subscriber information; the target subscriber extraction step includes, from the subscriber information with which the number of household terminals is associated at the household terminal number extraction step, extracting the subscriber information of the mobile terminals that meet a predetermined subscriber extraction condition stored in advance; and the household number extraction step includes, by referring to the subscriber information extracted at the target subscriber extraction step and counting the number of household identifiers for which the numbers of household terminals extracted at the household terminal number extraction step are the same, extracting the number of households per number of terminals.

In this case, because the number of households per number of terminals on the basis of the subscriber information extracted with the predetermined subscriber extraction condition is extracted, it is possible to obtain the number of households per number of household members regarding people and households that meet the subscriber extraction condition.

In addition, in the household member number distribution estimation apparatus of the present invention, the household number extraction means, by referring to the subscriber information extracted by the target subscriber extraction means and counting the number of user IDs the household identifiers of which are the same for each of the household identifiers, obtains the number of target household terminals that is the number of mobile terminals that belong to a household identified by the household identifier and meet the predetermined subscriber extraction condition; obtains for each household identifier the corrected number of target households that is the number obtained by dividing the number of target household terminals by the number of household terminals associated with the household identifier; and extracts the number of households per number of terminals by adding up the corrected numbers of target households for each of the household terminals.

In this case, the number of households per number of terminals is corrected with the number of users who meet the subscriber extraction condition, whereby the accuracy of estimation of the number of households per number of household members improves.

In addition, the household member number distribution estimation apparatus of the present invention further includes positional information acquisition means for acquiring positional information indicating locations of the mobile terminals in association with each of the user IDs, wherein the subscriber extraction condition is the subscriber information in which the positional information acquired by the positional information acquisition means corresponds to the user IDs contained in a predetermined area.

In this case, based on subscriber information of subscribers who exist in the predetermined area, the number of households per number of terminals is extracted, whereby it is possible to obtain the number of households per number of household members regarding people who exist in the predetermined area.

In addition, in the household member number distribution estimation apparatus of the present invention, the subscriber information acquisition means obtains subscriber information with which the user IDs, the household identifiers, and user attribute information regarding the users of the mobile terminals are associated, and the subscriber extraction condition includes that the user attribute information of the subscriber information acquired by the subscriber information acquisition means is the subscriber information that corresponds to the user IDs meeting a predetermined condition.

In this case, based on the subscriber information of subscribers whose user attribute information meets the predetermined condition, the number of households per number of terminals is extracted, whereby it is possible to obtain the number of households per number of household members regarding people who meet the predetermined condition.

In addition, in the household member number distribution estimation apparatus of the present invention, the user attribute information includes at least one of age, sex, and occupation of the users of the mobile terminals.

In this case, based on the subscriber information of subscribers whose condition regarding at least one of age, sex, and occupation of users meet the predetermined condition, the number of households per number of terminals is extracted, whereby it becomes possible to obtain the number of households per number of household members regarding people whose condition regarding at least one of age, sex, and occupation meets the predetermined condition.

Advantageous Effects of Invention

With the household member number distribution estimation apparatus and the household member number distribution estimation method of the present invention, without placing a particular burden such as data collection or research to obtain the number of household members, it becomes possible to obtain highly accurate household member number distribution in a region within a predetermined range.

BRIEF DESCRIPTION OF DRAWINGS

FIG. 5 includes diagrams illustrating one example of data of the number of household terminals for each main line number extracted from the subscriber information, data of the number of households for each of the number of household terminals, and data of the number of households for each of the number of household members obtained by correction.

FIG. 12 includes diagrams illustrating one example of data of the number of household terminals for each main line number extracted from the subscriber information, subscriber information with which data of the number of the household terminals is combined, the subscriber information for mobile terminals whose positional information meets a subscriber extraction condition and that are extracted, data of the number of households for each of the number of household terminals, and data of the number of households for each of the number of household members obtained by correction.

FIG. 15 includes diagrams, in a third embodiment, illustrating one example of subscriber information with which pieces of data of positional information, user attributes, and the number of household terminals are combined, subscriber information for mobile terminals whose user attributes information meets a subscriber extraction condition and that are extracted, data of the number of households per number of household terminals, and data of the number of households per number of household members obtained by correction.

DESCRIPTION OF EMBODIMENTS

Embodiments of a household member number distribution estimation apparatus according to the present invention will be described with reference to the drawings. It should be noted that, when appropriate, like reference signs are given to like parts, and redundant explanations are omitted.

First Embodiment

Figure 1:
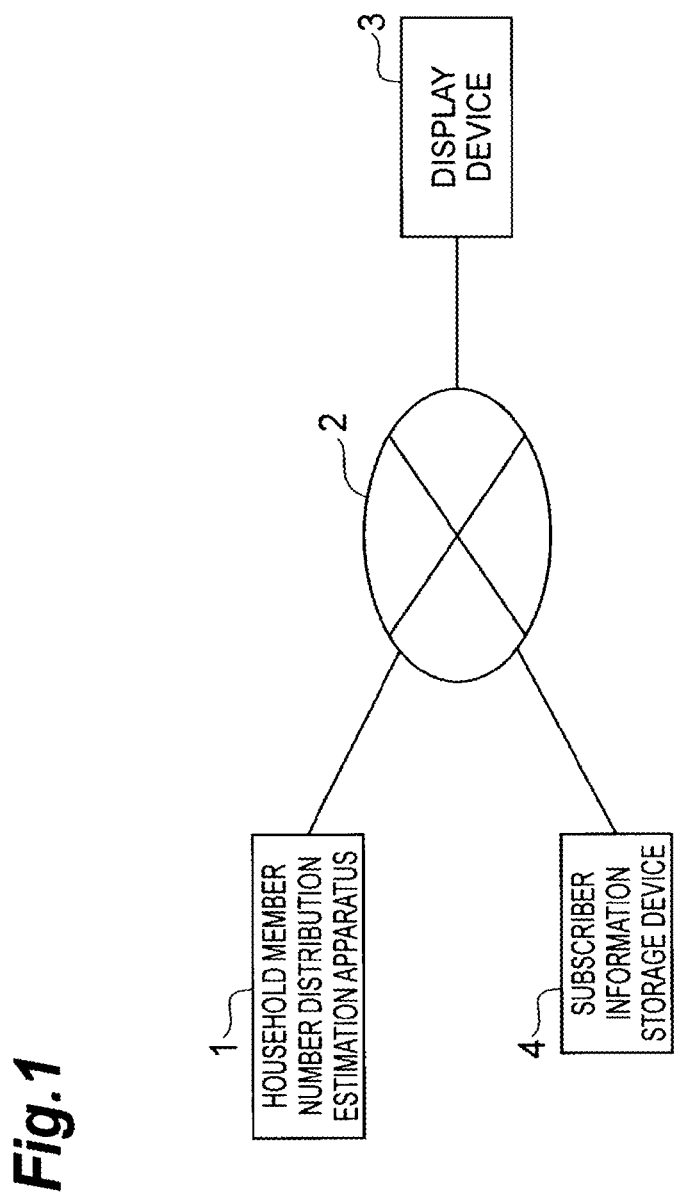
FIG. 1 is a diagram of a whole structure of a system including a household member number distribution estimation apparatus.

FIG. 1 is a diagram of a whole structure of a system including a household member number distribution estimation apparatus according to a first embodiment. As depicted in FIG. 1, the household member number distribution estimation apparatus 1 is communicably connected with a display device 3 and a subscriber information storage device 4 via a network 2.

The display device 3 is a device for obtaining household member number distribution that is the number of households per number of household members from the household member number distribution estimation apparatus 1 to display it to users, and is constituted by terminal devices exemplified by a personal computer, for example. It should be noted that, in the present embodiment, the display device 3 is configured to be connected with the household member number distribution estimation apparatus 1 via the network 2, but in place of this configuration, it may be a display that is directly connected with the household member number distribution estimation apparatus 1.

Figure 2:
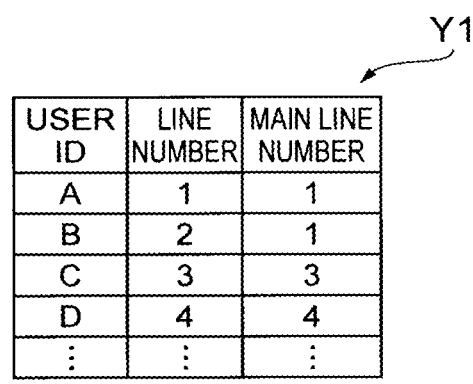
FIG. 2 is a diagram illustrating one example of a structure and contents of subscriber information acquired by the household member number distribution estimation apparatus.

The subscriber information storage device 4 is a device that store therein information of subscribers in a specific carrier providing a communication service for mobile terminals such as a cellular phone. FIG. 2 is a diagram illustrating an example of subscriber information stored in the subscriber information storage device 4. As depicted in FIG. 2, subscriber information Y1 is information in which a line number and a main line number are associated with each user ID that is information for identifying a mobile terminal.

The line number is a number individually given to each of the mobile terminals and enables a mobile terminal to be identified similarly to the user ID. The main line number is a number for identifying a group to which a plurality of mobile terminals belong. For example, there is a case in which a specific carrier provides a type of subscription to mobile terminals on a household basis. In such a case, a main line number serves as information for identifying a household. In the present embodiment, it is assumed that in a subscription to mobile terminals for each household, a mobile terminal of one user included in the household is a master terminal, the other terminals are slave terminals, and further the main line number of the master terminal is the same as its line number. More specifically, in FIG. 2, the mobile terminal of user ID "A" is a master terminal, and accordingly the main line number of user ID "A" is "1" that is the same as its line number. In addition, the mobile terminal of user ID "B" belongs to the same household as that of the mobile terminal of user ID "A", and accordingly the main line number of user ID "B" is "1" the same as the main line number of the mobile terminal of user ID "A". It should be noted that main line numbers in the present embodiment constitute household identifiers in the present invention.

Figure 3:
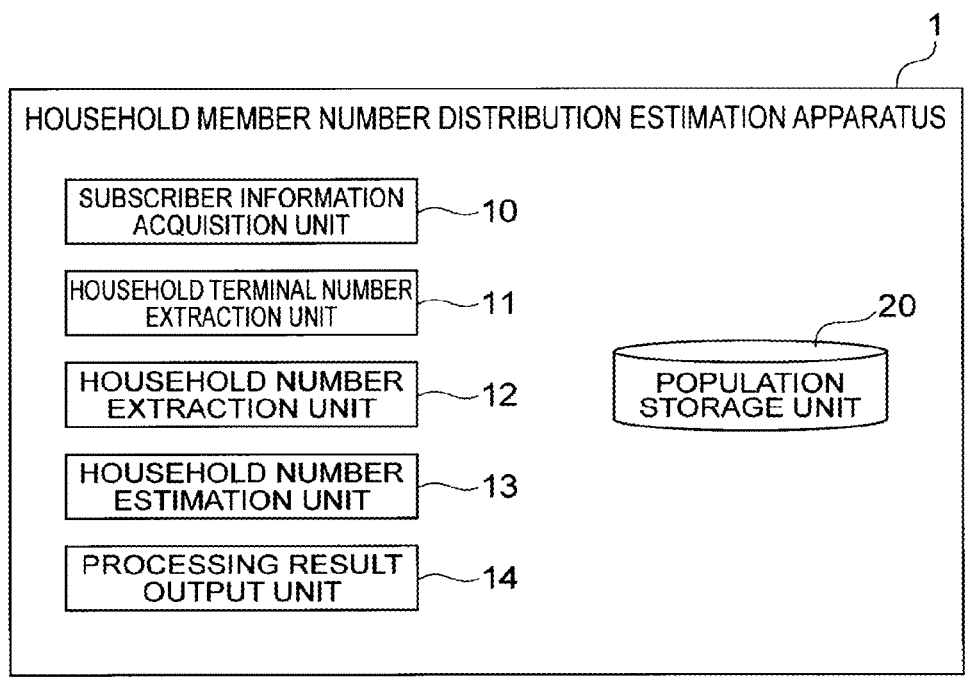
FIG. 3 is a block diagram illustrating a functional structure of the household member number distribution estimation apparatus.

Subsequently, the household member number distribution estimation apparatus 1 will be described. The household member number distribution estimation apparatus 1 is a device that estimates the number of households per number of household members, which is the number of households for each of the number of household members that is the number of people constituting the household in a region within a predetermined range. FIG. 3 is a block diagram illustrating a functional structure of the household member number distribution estimation apparatus 1. In addition, FIG. 4 is a hardware block diagram of the household member number distribution estimation apparatus 1.

Figure 4:
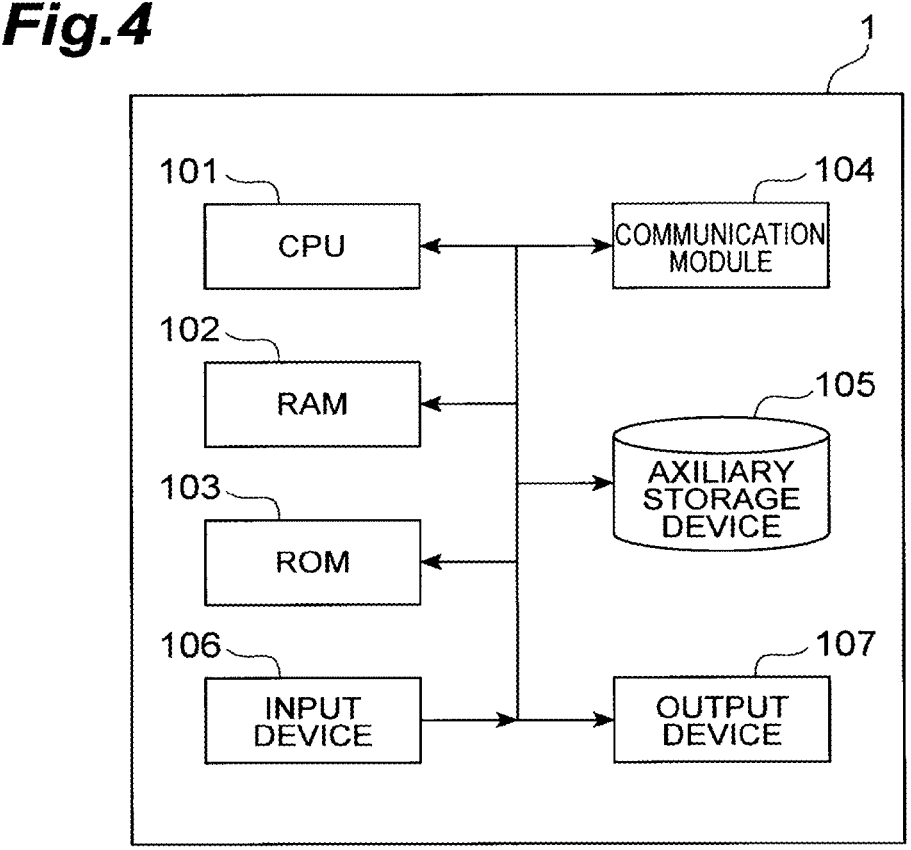
FIG. 4 is a hardware block diagram of the household member number distribution estimation apparatus.

The household member number distribution estimation apparatus 1, as depicted in FIG. 4, is physically configured as a computer system that includes a CPU 101, a RAM 102 and a ROM 103 that are main storage devices, a communication module 104 that is a data transmitting and receiving device such as a network card, an auxiliary storage device 105 such as a hard disk and a flash memory, an input device 106 such as a keyboard and a mouse being an input device, and an output device 107 such as a display. Each function depicted in FIG. 3 is implemented, with predetermined computer software loaded on hardware such as the CPU 101 and the RAM 102 illustrated in FIG. 4, by operating the communication module 104, the input device 106, and the output device 107 under the control of the CPU 101 and by reading and writing data from and to the RAM 102 or the auxiliary storage device 105.

Referring again to FIG. 3, each functional unit of the household member number distribution estimation apparatus 1 will be described in detail. The household member number distribution estimation apparatus 1 functionally includes a subscriber information acquisition unit 10 (subscriber information acquisition means), a household terminal number extraction unit 11 (household terminal number extraction means), a household number extraction unit 12 (household number extraction means), a household number estimation unit 13 (household number estimation means), and a processing result output unit 14 (processing result output means). In addition, the household member number distribution estimation apparatus 1 may further include a population storage unit 20 (population storage means).

The subscriber information acquisition unit 10 is a unit that acquires subscriber information Y1 that is information relating to subscribers of mobile terminals of a specific carrier in the region within the predetermined range. In the present embodiment, the subscriber information acquisition unit 10 acquires the subscriber information Y1 from the subscriber information storage device 4. In addition, the region within the predetermined range is the whole of Japan, for example.

It should be noted that there is a case in which, in the subscriber information Y1, information such as corporate subscription that is unnecessary for estimation of household member number distribution is included. In such a case, the subscriber information acquisition unit 10, from the subscriber information Y1, extracts only subscriber information regarding personal subscription. Furthermore, the subscriber information acquisition unit 10 counts the number of personal subscribers in the subscriber information regarding personal subscription extracted and sends the number of the personal subscribers counted to the household number estimation unit 13.

The household terminal number extraction unit 11 is a unit that refers to the subscriber information Y1 acquired by the subscriber information acquisition unit 10 and extracts the number of household terminals that is the number of mobile terminals belonging to the household for each main line number. More specifically, the household terminal number extraction unit 11, by referring to the subscriber information Y1 and counting the number of user IDs or line numbers with which the same main line number is associated, extracts the number of household terminals. FIG. 5($a$) is a diagram illustrating a table T1 that stores therein the number of household terminals extracted from the subscriber information Y1 by the household terminal number extraction unit 11. For example, in the subscriber information Y1 depicted in FIG. 2, the number of user IDs or line numbers with which main line number "1" is associated is two of user ID "A" (line number "1") and user ID "B" (line number "2"). Therefore, in the table T1, the number of household terminals of main line number "1" is "2".

The household number extraction unit 12 is a unit that, for each of the number of household terminals extracted by the household terminal number extraction unit 11, extracts the number of households per number of terminals that is the number of households for each of the number of household terminals. More specifically, the household number extraction unit 12, by counting the number of main line numbers for which the numbers of household terminals extracted by the household terminal number extraction unit 11 are the same, extracts the number of households per number of terminals. FIG. 5($b$) is a diagram illustrating a table T2 that stores therein the number of households per number of terminals extracted by the household number extraction unit 12. For example, in the table T1 illustrated in FIG. 5($a$), the number of main line numbers for which the number of household terminals is "1" includes two of main line numbers "3" and "4". Therefore, in the table T2, the number of households per terminal associated with the number of household terminals "1" is "2".

The household number estimation unit 13 is a unit that, by using a terminal subscription rate that is the ratio of the number of subscribers of mobile terminals of a specific carrier to population in the region within the predetermined range to correct the number of households per number of terminals extracted by the household number extraction unit 12, estimates the number of households per number of household members. It should be noted that the terminal subscription rate may be stored in advance in the household member number distribution estimation apparatus 1, or may be input every time a process is performed. Alternatively, as described later, the terminal subscription rate may be calculated by the household number estimation unit 13.

Figure 6:
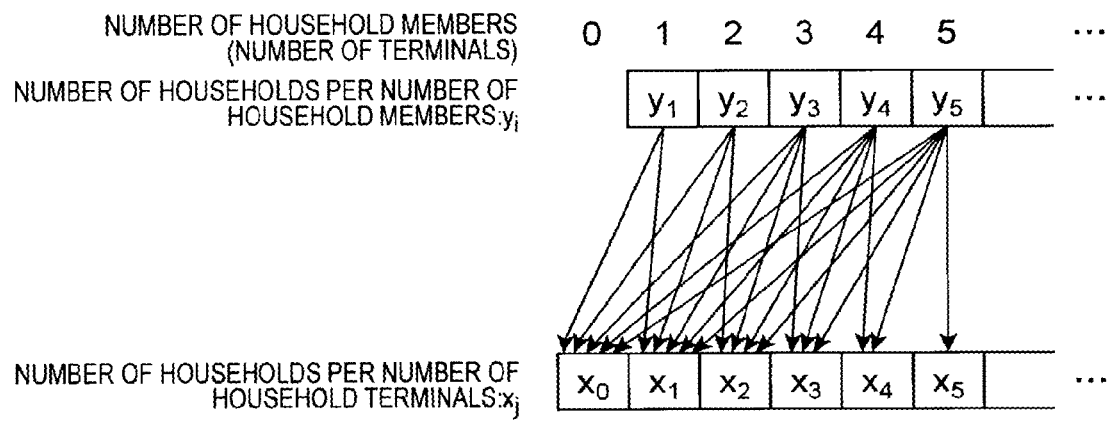
FIG. 6 is a diagram illustrating a relationship between the number of households for each of the number of household members and the number of households for each of the number of household terminals.

In general, it does not happen that all of the people in a region within a predetermined range are subscribers of mobile terminals of a specific carrier. In addition, all of the members included in a household in a region within a predetermined range are not always subscribers of mobile terminals of a specific carrier. FIG. 6 is a diagram, based on such a situation, illustrating a relationship between the number of households for each of the number of household members and the number of households for each of the number of household terminals. For example, regarding households with two household members, when all of the members con-stituting each of the households are subscribers of the specified carrier, they are counted as households with two household terminals. However, when only one of members constituting a household is a subscriber of the specific carrier, this household is counted as a household with one household terminal. Furthermore, when a subscriber of the specific carrier is not included in the members constituting the household, this household is counted as a household with zero household terminals. More specifically, in FIG. 6, it is possible for households with two household members and counted into $y_2$ to be counted as households with two, one, or zero household terminal(s) into any one of $x_2$, $x_1$ or $x_0$, respectively.

As described above, the relationship between the number of households for each of the number of household members and the number of households for each of the number of household terminals is as depicted in FIG. 6, and accordingly the household number estimation unit 13, specifically where the number of households per number of terminals is set as $x_j$ when the number of household terminals is set as j, the number of households per number of household members is set as $y_i$ when the number of household members is set as i, and the terminal subscription rate is set as P, by using the following formula (1) for obtaining $x_j$ on the basis of $y_i$, $$x_j = \sum_{i=j}^{\infty} {}_iC_j P^j (1-P)^{i-j} y_i \qquad (1)$$

and performing an operation to obtain $y_i$ that satisfies the formula (1) on the basis of $x_j$, estimates the number of households per number of household members.

More specifically, where a vector having $x_0$, $x_1$, $x_2$, . . . as its elements is set as X and a vector having $y_0$, $y_1$, $y_2$, . . . as its elements is set as Y, when expressing the formula (1) by the following formula (2) using a matrix A, $$X = AY \qquad (2)$$

the household number estimation unit 13 calculates the inverse matrix $A^{-1}$ of the matrix A and, by using the inverse matrix $A^{-1}$ calculated to perform an operation represented in the following formula (3), $$Y = A^{-1} X \qquad (3)$$

estimates the number of households per number of household members. It should be noted that it is possible to obtain the terminal subscription rate P by dividing the number of personal subscribers sent from the subscriber information acquisition unit 10 by the value of population in a region within a predetermined range. It should be noted that the number of respective elements of the vector X and the vector Y, and the number of terms of summation operation in the formula (1) are theoretically the number of household members at the maximum in the region within the predetermined range the household member number distribution in which is to be estimated, but for the actual operation, it is possible to maintain a certain level of accuracy in operation by using the number of household members for which a certain or larger number of households actually exist.

With this estimation method, to correct the number of households per number of terminals obtained from the subscriber information in the specific carrier into a value with consideration given to all members in the region within the predetermined range, an operation using the terminal subscription rate is performed, whereby it is possible to obtain the number of households per number of household members with high accuracy. FIG. 5(c) is a diagram illustrating an example of a table T3 that stores therein the number of households per number of household members estimated by the household number estimation unit 13. As depicted in the table T3, for example, the number of households per number of terminals in the table T2 is corrected, and thus the number of households per household member for the number of household members "1" becomes "1", and the number of households per household member for the number of household members "2" becomes "2".

It should be noted that the household number estimation unit 13, in place of obtaining the elements of the vector Y by the above-mentioned formula (3) to estimate the number of households per number of household members, may estimate the number of households per number of household members by the following method. In other words, the household number estimation unit 13, based on the relationship between the vectors X and Y represented in the formula (2), solves the following formula (4) as an optimization problem, $$|X-AY|=0 \quad (4)$$

making it possible to estimate the number of households per number of household members.

More specifically, the household number estimation unit 13 performs an operation to obtain the vector Y that minimizes the following formula (5) by using the least square method, $$\sum_{j=0}^{\infty}\left(x_j - \sum_{i=j}^{\infty} {}_iC_j P^j (1-P)^{i-j} y_i\right)^2 \quad (5)$$

(condition: $y_i \geq 0$)

thereby estimating the number of households per number of household members.

It should be noted that when the household member number distribution estimation apparatus 1 includes the population storage unit 20, the household number estimation unit 13, based on information regarding population stored in the population storage unit 20 and the number of subscribers (the number of personal subscribers) of mobile terminals included in the subscriber information acquired from the subscriber information acquisition unit 10, may calculate the terminal subscription rate.

The processing result output unit 14 is a unit that outputs the number of households per household member estimated by the household number estimation unit 13 to the display device 3, for example, to make the display device 3 display it.

The population storage 20 is storage means for storing information regarding population in a region within a predetermined range in advance. The information regarding population, by being input by the input device 106 that the household member number distribution estimation apparatus 1 includes, input from an input device that the display device 3 includes, or sent from another device to the household member number distribution estimation apparatus 1 via the network 2, is stored in the population storage unit 20. It should be noted that the population storage device 20 is not an indispensable component in the present embodiment.

Figure 7:
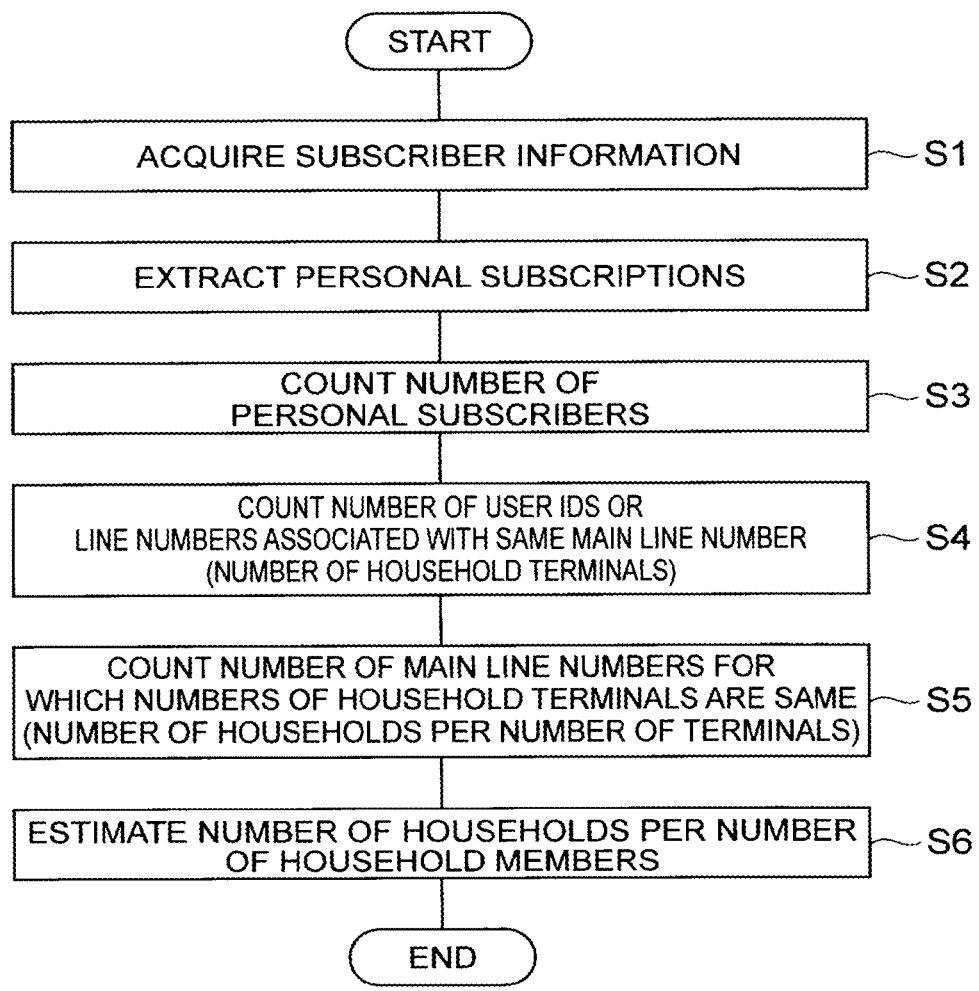
FIG. 7 is a flowchart illustrating processes of household member number distribution estimation method implemented in the household member number distribution estimation apparatus.

Subsequently, referring to FIG. 7, an operation of the household member number distribution estimation apparatus 1 in a household member number distribution estimation method of the present embodiment will be described. FIG. 7 is a flowchart illustrating processes performed in the household member number distribution estimation apparatus 1.

To begin with, the subscriber information acquisition unit 10 acquires subscriber information from the subscriber information storage device 4 (S1). In addition, the subscriber information acquisition unit 10, from the subscriber information, extracts only subscriber information regarding personal subscription (S2). Furthermore, the subscriber information acquisition unit 10 counts the number of personal subscribers in the subscriber information regarding personal subscription extracted, and sends the number of the personal subscribers counted to the household number estimation unit 13 (S3).

Next, the household terminal number extraction unit 11, by referring to the subscriber information (only for personal subscribers) acquired by the subscriber information acquisition unit 10 and counting the number of user IDs or line numbers with which the same main line number is associated, extracts the number of household terminals for each main line number (S4).

Subsequently, the household number extraction unit 12, by counting the number of main line numbers for which the numbers of household terminals extracted by the household terminal number extraction unit 11 are the same, extracts the number of household per number of terminals for each of the number of household terminals (S5).

Next, the household number estimation unit 13, by using the terminal subscription rate that is the ratio of the number of subscribers of mobile terminals to population in a region within a predetermined range to correct the number of households per number of terminals extracted by the household number extraction unit 12, estimates the number of households per number of household members (S6). Estimation of the number of households per number of household members is performed by using the above-mentioned formulas (1) to (3), or the above-mentioned formulas (1), (2), (4), and (5). The processing result output unit 14 then outputs the number of households per household member estimated by the household number estimation unit 13 to the display device 3, for example, to make the display device 3 display it.

Subsequently, operational effects of the household member number distribution estimation apparatus and the household member number distribution estimation method of the first embodiment described above will be described. In the household member number distribution estimation apparatus and the household member number distribution estimation method of the first embodiment, because the subscriber information acquisition unit 10 acquires subscriber information that is subscriber information of subscribers of a specific carrier and includes information of households to which users belong and estimates distribution of the number of household members on the basis of the subscriber information acquired, a particular burden such as data collection or research for the estimation does not arise. In addition, based on the subscriber information of the specific carrier, after the household number extraction unit 12 extracts the number of households for each of the number of household terminals to obtain the number of households for each of the number of household members included in the subscribers of the specific carrier, the household number estimation unit 13 performs correction by using the terminal subscription rate in a region within a predetermined range to estimate the number of households per number of household members, whereby highly accurate household member number distribution in the region can be obtained.

Second Embodiment

Figure 8:
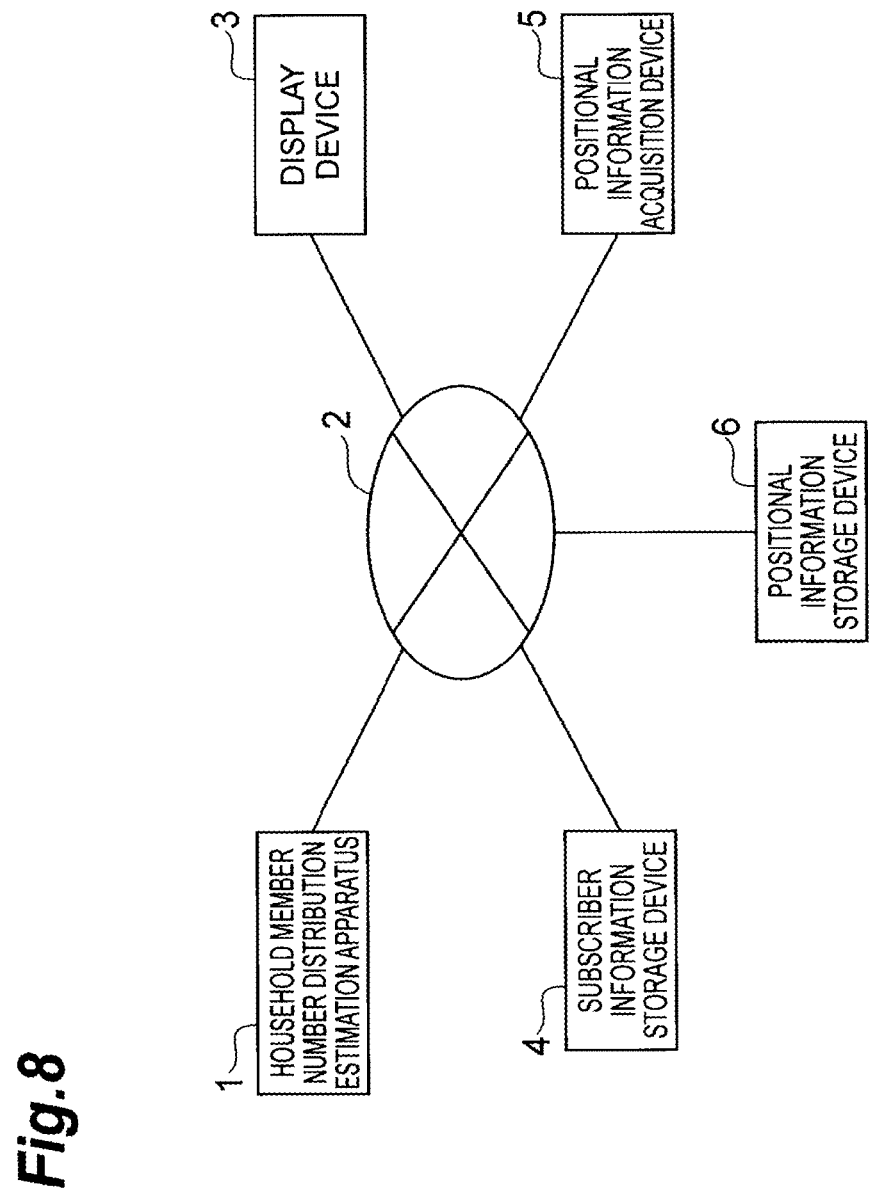
FIG. 8 is a diagram of a whole structure of a system including a household member number distribution estimation apparatus according to a second embodiment.

A household member number distribution estimation apparatus according to a second embodiment will be described, hereinafter. FIG. 8 is a diagram of a whole structure of a system including the household member number distribution estimation apparatus according to the second embodiment. As depicted in FIG. 8, this household member number distribution estimation apparatus 1 is communicably connected with the display device 3, the subscriber information storage device 4, a positional information acquisition device 5, and a positional information storage device 6 via the network 2.

The positional information acquisition device 5 is a device that acquires positional information of mobile terminals of subscribers of a specific carrier. There are various methods to acquire positional information. For example, when a mobile terminal including a GPS device requests a service using positional information, positional information acquired by the GPS device is sent to a service providing device that provides the service. The positional information acquisition device 5 can acquire the positional information of the mobile terminal sent to the service providing device from the service providing device. In addition, in general, because a mobile terminal is within communication range of a cell formed by any one of base stations, it is possible to set information of the location of such a base station as the positional information of the mobile terminal. In this case, the positional information acquisition device 5 can acquire positional information of mobile terminals from a base station or a switch accommodating a plurality of base stations. The positional information acquisition device 5 sends the positional information of the mobile terminals acquired to the positional information storage device 6.

Figure 9:
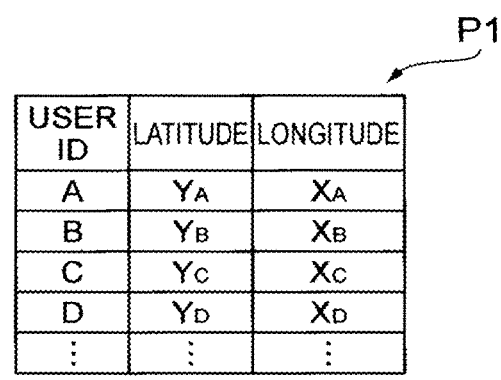
FIG. 9 is a diagram illustrating one example of a structure and contents of positional information acquired by the household member number distribution estimation apparatus.

The positional information storage device 6 is a device that stores therein positional information of mobile terminals sent from the positional information acquisition device 5. FIG. 9 is a diagram illustrating an example of positional information stored in the positional information storage device 6. As depicted in FIG. 9, positional information P1 is information with which a location indicated by latitude and longitude for each user ID that is information for identifying a mobile device is associated. It should be noted that, in the present embodiment, as information indicating a location, latitude and longitude are used, but it is not limited to this as long as it is information indicating a location.

Figure 10:
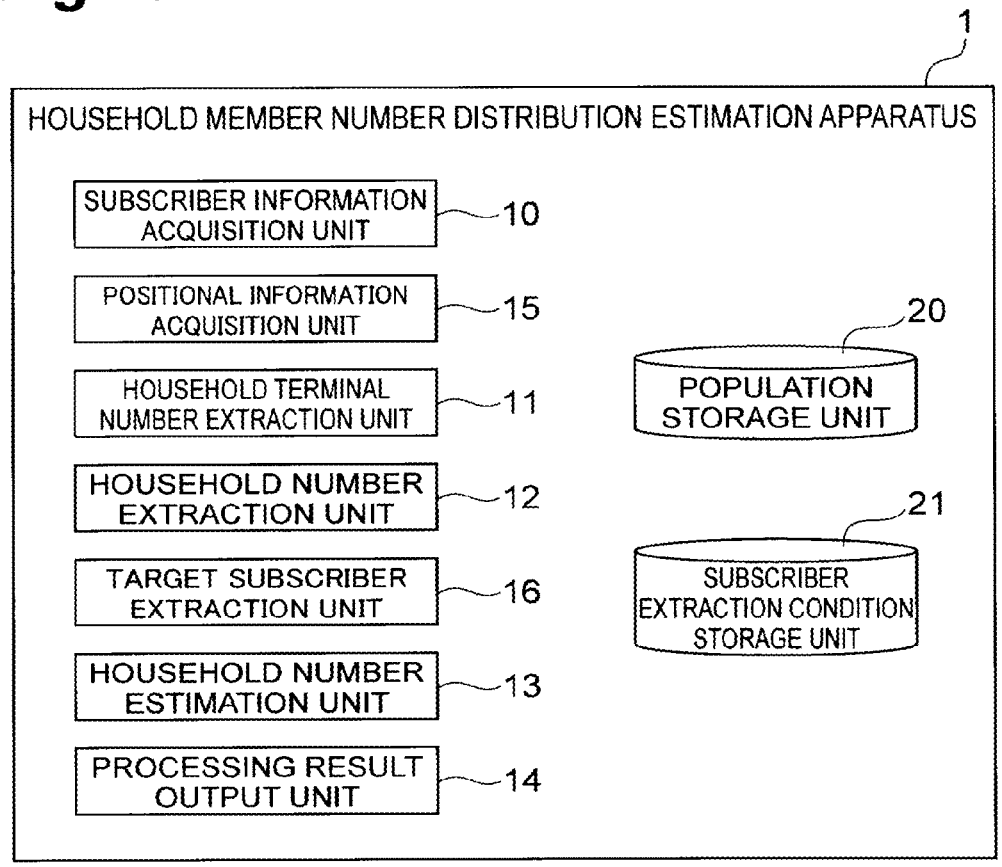
FIG. 10 is a block diagram illustrating a functional structure of the household member number distribution estimation apparatus according to the second embodiment.

Subsequently, the household member number distribution estimation apparatus 1 according to the second embodiment will be described in detail. FIG. 10 is a block diagram illustrating a functional structure of the household member number distribution estimation apparatus 1 in the second embodiment. In addition to each functional unit that the household member number distribution estimation apparatus 1 of the first embodiment, the household member number distribution estimation apparatus 1 in the second embodiment includes a positional information acquisition unit 15 (positional information acquisition means), a target subscriber extraction unit 16 (target subscriber extraction means), and a subscriber extraction condition storage unit 21 (subscriber extraction condition storage means). A function and an operation of each functional unit in the second embodiment will be explained hereinafter, but for functional units whose function and operation are the same as those of the first embodiment, explanation is omitted.

The positional information acquisition unit 15 is a unit that acquires the positional information P1 from the positional information storage device 6.

Figure 11:
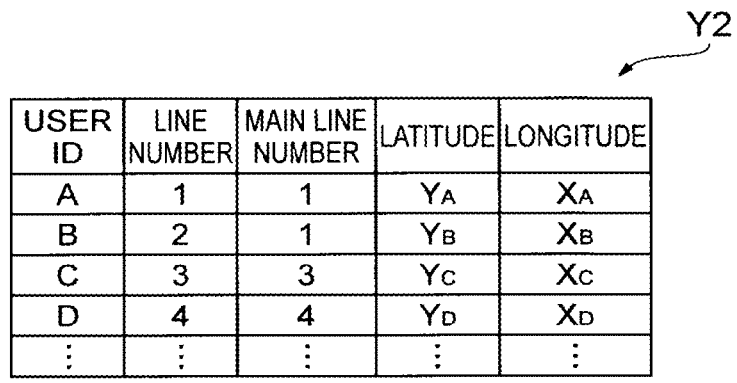
FIG. 11 is a diagram illustrating one example of a structure and contents of subscriber information with which positional information is combined.

The subscriber information acquisition unit 10 acquires subscriber information Y1 as depicted in FIG. 2, for example. In addition, the subscriber information acquisition unit 10 combines the positional information P1 acquired by the positional information acquisition unit 15 with the subscriber information Y1 acquired, using user IDs as keys. FIG. 11 is a diagram illustrating subscriber information Y2 with which the positional information P1 is combined. For example, with the record of user ID "A", positional information indicated by latitude "$Y_A$" and longitude "$X_A$" is associated. Furthermore, the subscriber information acquisition unit 10, from the subscriber information Y1, extracts only subscriber information regarding personal subscription, counts the number of personal subscribers extracted, and sends the number of the personal subscribers counted to the household number estimation unit 13.

The household terminal number extraction unit 11, by referring to the subscriber information Y2 and counting the number of user IDs or line numbers with which the same main line number is associated, extracts the number of household terminals for each main line number, and also stores therein the number of household terminals extracted in association with main line numbers and user IDs in the subscriber information Y2. FIG. 12(*a*) is a diagram illustrating a table T4 storing therein the number of household terminals extracted for each main line number. In addition, FIG. 12(*b*) is a diagram illustrating subscriber information Y3 with which the number of household terminals is associated. In the subscriber information Y3, for example, the main line numbers of user IDs "A" and "B" are "1", and accordingly the number of household terminals "2" of the main line number "1" in the table T4 is stored as the number of household terminals of user IDs "A" and "B".

The target subscriber extraction unit 16 is a unit that, from the subscriber information Y3 with which the number of household terminals is associated by the household terminal number extraction unit 11, extracts subscriber information of mobile terminals that meet a predetermined subscriber extraction condition. The predetermined subscriber extraction condition is stored in the subscriber extraction condition storage unit 21 in advance, and the target subscriber extraction unit 16 reads the predetermined subscriber extraction condition from the subscriber extraction condition storage unit 21 and uses it to extract the subscriber information. In the present embodiment, it is set as the predetermined subscriber extraction condition that the positional information P1 acquired by the positional information acquisition unit 15 is subscriber information corresponding to user IDs contained in a predetermined area. FIG. 12(*c*) is a diagram illustrating subscriber information Y4 into which records corresponding to user IDs whose positional information P1 is contained in the predetermined area are extracted from the subscriber information Y3. In other words, the example of the present embodiment indicates the case where pieces of positional information of user IDs "A", "C", and "D" are contained in the predetermined area.

The subscriber extraction condition storage unit 21 is storage means for storing therein in advance a predetermined subscriber extraction condition for extracting subscribers. The subscriber extraction condition, by being input by the input device 106 that the household member number distribution estimation apparatus 1 includes, input by an input device that the display device 3 includes, or sent from another device to the household member number distribution apparatus 1 via the network 2, for example, is stored in the subscriber extraction condition storage unit 21.

The household number extraction unit 12 refers to the subscriber information Y4 extracted by the target subscriber extraction unit 16, and extracts the number of households per number of terminals as follows. In other words, the household number extraction unit 12, by counting the number of user IDs the main line numbers of which are the same for each main line number, obtains the number of target household terminals that is the number of mobile terminals that belong to the household identified by the main line number and meet the predetermined subscriber extraction condition. Next, the household number extraction unit 12 obtains for each main line number the corrected number of target households that is the number obtained by dividing the number of target household terminals by the number of household terminals associated with the main line number. The household number extraction unit 12 then extracts the number of households per number of terminals by adding up the corrected numbers of target households for each of the number of household terminals.

FIG. 12(*d*) is a diagram illustrating a table T5 storing therein the number of households per number of terminals extracted by the household number extraction unit 12. For example, in the subscriber information Y4, the number of user IDs whose main line number is "1" is one for user ID "A", and accordingly in the table T5, the number of target household terminals "1" is associated with the main line number "1". In addition, "0.5" that is the number obtained by dividing the target household terminals "1" by the number of household terminals "2" associated with the main line number "1" is associated as the corrected number of target households. Furthermore, when adding up the corrected number of target households with respect to the number of household terminals "2", "0.5" is extracted as the number of households per number of terminals. In the same manner, when extracting the number of households per number of terminals with respect to the number of household terminals "1", the number of households per number of terminals becomes "2". It should be noted that the household number extraction unit 12 may extract the number of households per number of terminals by the same method as that of the first embodiment.

The household number estimation unit 13, in the same manner as the first embodiment, by using the terminal subscription rate to correct the number of households per number of terminals extracted by the household number extraction unit 12, estimates the number of households per number of household members. FIG. 12(*e*) is a diagram illustrating an example of a table T6 storing therein the number of households per number of household members estimated by the household number estimation unit 13. As depicted in the table T6, for example, the number of households per number of terminals in the table T5 is corrected, and thus the number of households per household member for the number of household members "1" becomes "1", the number of households per household member for the number of household members "2" becomes "2", and the number of households per household member for the number of household members "3" becomes "1".

The processing result output unit 14 outputs the number of households per household member estimated by the household number estimation unit 13 to the output device 3, for example, to make the output device 3 display it.

Figure 13:
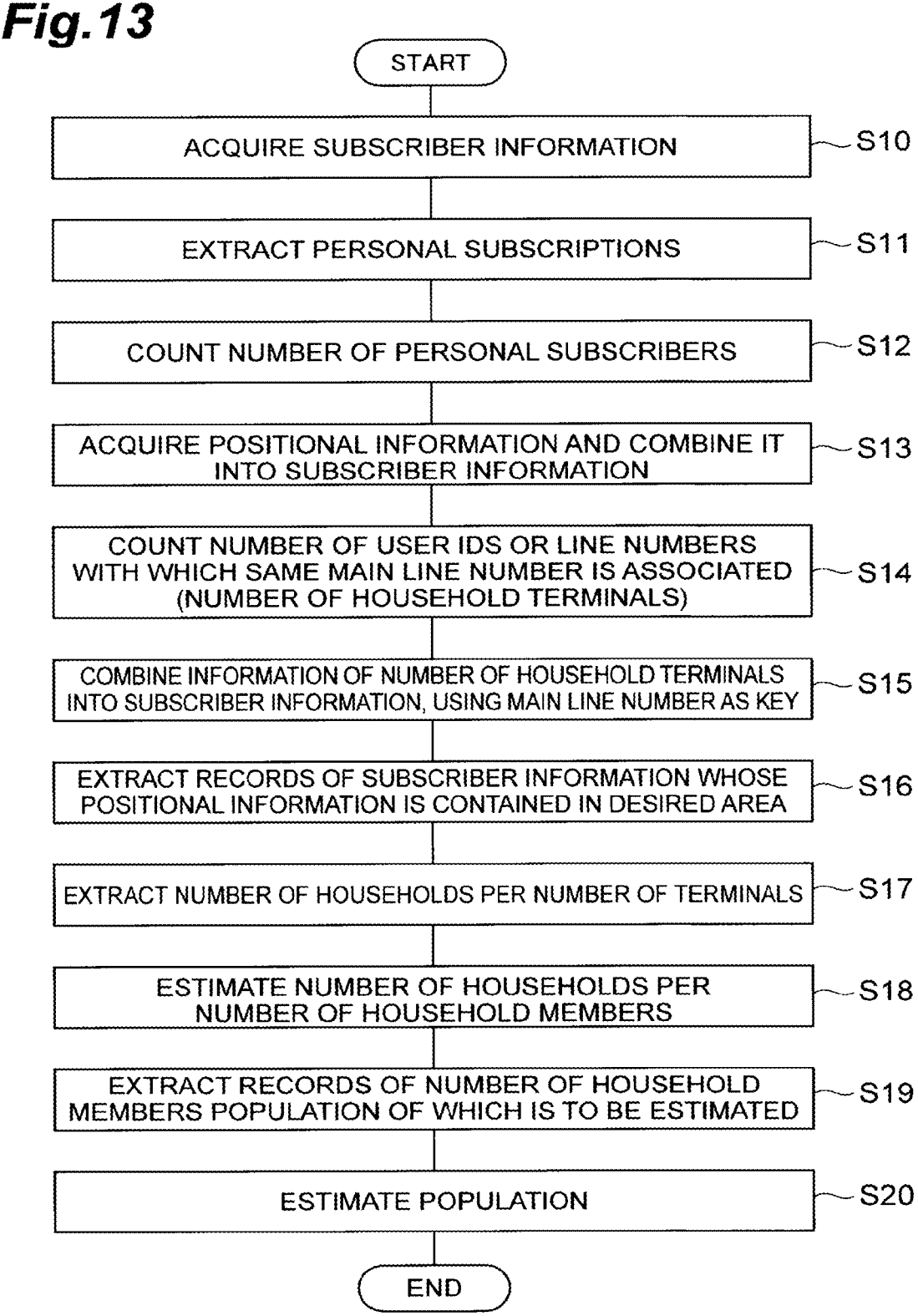
FIG. 13 is a flowchart illustrating processes of the household member number distribution estimation method according to the second embodiment.

Subsequently, referring to FIG. 13, operation of the household member number distribution estimation apparatus 1 in the second embodiment will be described. FIG. 13 is a flowchart illustrating processes performed in the household member number distribution estimation apparatus 1.

Processes at steps S10 to S12 are the same as those at steps S1 to S3 in the flowchart of FIG. 7. Following the process indicated at step S12, the positional information acquisition unit 15 acquires the positional information P1 from the positional information storage device 6, and the subscriber information acquisition unit 10 combines the positional information P1 acquired by the positional information acquisition unit 15 with the subscriber information Y1 acquired using user IDs as keys to generate the subscriber information Y2 (S13).

Next, the household terminal number extraction unit 11, by referring to the subscriber information Y2 generated by the subscriber information acquisition unit 10 and counting the number of user IDs or line numbers with which the same main line number is associated, extracts the number of household terminals for each main line number (S14). Furthermore, the household terminal number extraction unit 11 associates and combines the number of household terminals extracted with the main line numbers and the user IDs in the subscriber information Y2 to generate the subscriber information Y3, and stores therein the subscriber information Y3 generated (S15).

Next, the target subscriber extraction unit 16, from the subscriber information Y3 with which the number of household terminals is associated by the household terminal number extraction unit 11, extracts subscriber information of mobile terminals whose positional information P1 acquired by the positional information acquisition unit 15 is contained in a desired area (predetermined area) to generate the subscriber information Y4 (S16).

Subsequently, the household number extraction unit 12 refers to the subscriber information Y4 extracted by the target subscriber extraction unit 16, and extracts the number of households per number of terminals for each of the number of household terminals to generate the table T5 (S17). More specifically, the household number extraction unit 12, by counting the number of user IDs the main line numbers of which are the same for each main line number, obtains the number of target household terminals that is the number of mobile terminals that belong to the household identified by the main line number and meet the predetermined subscriber extraction condition. Next, the household number extraction unit 12 obtains for each main line number the corrected number of target households that is the number obtained by dividing the number of target household terminals by the number of household terminals associated with the main line number. The household number extraction unit 12 then extracts the number of households per number of terminals by adding up the corrected numbers of target households for each of the number of household terminals.

Next, the household number estimation unit 13, by using the terminal subscription rate to correct the number of households per number of terminals extracted by the household number extraction unit 12, estimates the number of households per number of household members to generate the table T6 (S18).

Furthermore, the household number estimation unit 13, using the number of households per number of household members estimated, can estimate population of people who meet the subscriber extraction condition of the target subscriber extraction unit 16 and correspond to the desired number of household members. In the estimation of population, to begin with, the household number estimation unit 13 extracts records of the number of household members population of which is to be estimated from the table T6 (S19). The household number estimation unit 13 then estimates population by multiplying the number of household members of the extracted records by the number of households per number of household members (S20). For example, population of people whose household has two members and who meet the subscriber extraction condition, by multiplying the number of household members "2" by the number of households per number of household members "2" associated with the number of household members "2" in the table T6, will be "4".

The processing result output unit 14 then outputs the number of households per household member estimated by the household number estimation unit 13 to the display device 3, for example, to make the display device 3 display it.

Subsequently, operational effects of the household member number distribution estimation apparatus 1 and the household member number distribution estimation method of the second embodiment described above will be described. In the household member number distribution estimation apparatus 1 and the household member number distribution estimation method of the second embodiment, because the number of households per number of terminals on the basis of subscriber information extracted with a predetermined subscriber extraction condition by the target subscriber extraction unit 16 is extracted, it is possible to obtain the number of households per number of household members regarding people and households that meet the subscriber extraction condition. In addition, based on subscriber information of subscribers who exist in a predetermined area, the number of households per number of terminals is extracted by the household number extraction unit 12, whereby it is possible to obtain the number of households per number of household members regarding people who exist in the predetermined area. In particular, in the present embodiment, because household member number distribution is estimated based on subscriber information acquired at a certain time or during a period of time, information such as the number of households per number of household members obtained becomes reflective of the time or the period of time of acquiring the subscriber information.

Third Embodiment

A household member number distribution estimation apparatus 1 according to a third embodiment will be described, hereinafter. While the target subscriber extraction unit 16 in the second embodiment uses positional information as a subscriber extraction condition to extract subscriber information, the third embodiment is an embodiment in which the target subscriber extraction unit 16 uses user attribute information instead. A function and an operation of each functional unit of the third embodiment will be described hereinafter. It should be noted that, for functional units whose function and operation are the same as those of the second embodiment, explanation is omitted. The household member number distribution estimation apparatus 1 of the third embodiment, in the same manner as that of the second embodiment, includes each functional unit depicted in FIG. 10.

Figure 14:
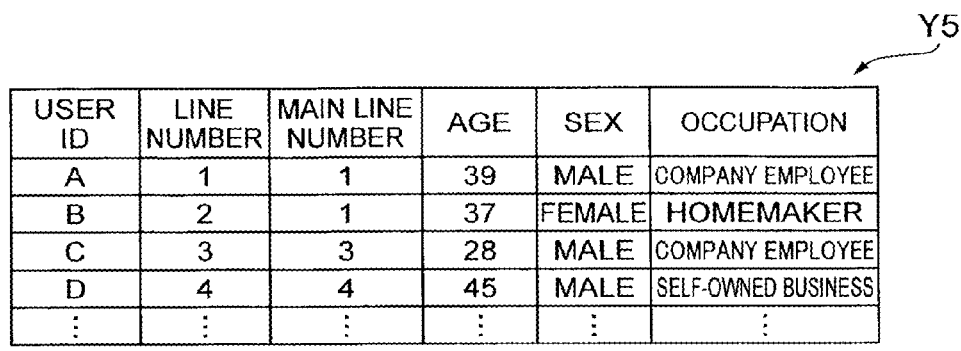
FIG. 14 is a diagram illustrating one example of a structure and contents of subscriber information including user attributes.

The subscriber information acquisition unit 10 acquires subscriber information with which user IDs, main line numbers, and user attribute information regarding users of the mobile terminals are associated. FIG. 14 is a diagram illustrating subscriber information Y5 acquired by the subscriber information acquisition unit 10 in the third embodiment. The user attribute information includes age, sex, and occupation of the users of the mobile terminals. It should be noted that, in the present embodiment, age, sex, and occupation are included as user attribute information, but it is acceptable that at least any one of these pieces of user attribute information is included.

The household terminal number extraction unit 11, by referring to the subscriber information Y5 and counting the number of user IDs or line numbers with which the same main line number is associated, extracts the number of household terminals for each main line number and stores therein the number of household terminals extracted in association with the main line numbers and the user IDs in the subscriber information Y5. FIG. 15(*a*) is a diagram illustrating subscriber information Y6 with which the number of household terminals is associated. In the subscriber information Y5, for example, the main line numbers of user IDs "A" and "B" are "1", and accordingly the number of household terminals of main line number "1" is "2", and in the subscriber information Y6, "2" is stored as the number of household terminals of user IDs "A" and "B".

The target subscriber extraction unit 16 is a unit that, from the subscriber information Y6 with which the number of household terminals is associated by the household terminal number extraction unit 11, extracts subscriber information of mobile terminals that meet a predetermined subscriber extraction condition. In the present embodiment, it is assumed that "sex of a user is male", for example, as the subscriber extraction condition. Accordingly, the target subscriber extraction unit 16, from the subscriber information Y6, extracts records of user IDs "A", "C", and "D" whose sex is male to generate subscriber information Y7. It should be noted that the subscriber extraction condition may be a condition set by using at least any one of age, sex, occupation included in the user attribute information, and positional information, may be a condition set by using a plurality of pieces of information, or may be a condition set by using all of the above-mentioned information.

The household number extraction unit 12, by referring to the subscriber information Y7 extracted by the target subscriber extraction unit 16 and counting the number of main line numbers for which the numbers of household terminals extracted by the household terminal number extraction unit 11 are the same, extracts the number of households per number of terminals. FIG. 15(*c*) is a diagram illustrating a table T7 that stores therein the number of households per number of terminals extracted by the household number extraction unit 12.

The household number estimation unit 13, by using the terminal subscription rate to correct the number of households per number of terminals extracted by the household number extraction unit 12, estimates the number of households per number of household members. FIG. 15(*d*) is a diagram illustrating an example of a table T8 that stores therein the number of households per number of household members estimated by the household number estimation unit 13.

Subsequently, operational effects of the household member number distribution estimation apparatus 1 of the third embodiment described above will be described. In the household member number distribution estimation apparatus 1 of the third embodiment, subscriber information of subscribers whose user attribute information meets a subscriber extraction condition is extracted by the target subscriber extraction unit 16, and the number of households per number of terminals on the basis of the subscriber information extracted, whereby it is possible to obtain the number of households per number of household members regarding people who meet the predetermined condition.

REFERENCE SIGNS LIST

1 . . . household member distribution estimation apparatus, 3 . . . display device, 4 . . . subscriber information storage device, 6 . . . positional information storage device, 10 . . . subscriber information acquisition unit, 11 . . . household terminal number extraction unit, 12 . . . household number extraction unit, 13 . . . household number estimation unit, 14 . . . processing result output unit, 15 . . . positional information acquisition unit,
16 . . . target subscriber extraction unit, 20 . . . population storage unit, 21 . . . subscriber extraction condition storage unit,
P1 . . . positional information, Y1 to Y7 . . . subscriber information

What is claimed is:

1. A household member number distribution estimation apparatus that estimates number of households per number of household members that is the number of households for each number of household members constituting a household in a region within a predetermined range, the household member number distribution estimation apparatus comprising:
computer circuitry configured to function as
a subscriber information acquisition section configured to acquire subscriber information that is information regarding subscribers of mobile terminals of a specific carrier in the region within the predetermined range and with which user IDs each of which is information for identifying a mobile terminal and household identifiers each of which is information for identifying a household to which a user of the mobile terminal belongs are associated;
a household terminal number extraction section configured to, by referring to the subscriber information acquired by the subscriber information acquisition section and counting number of the user IDs with which the same household identifier is associated, extract number of household terminals that is number of the mobile terminals belonging to the household for each of the household identifiers;
a household number extraction section configured to, by counting number of the household identifiers for which the numbers of household terminals extracted by the household terminal number extraction section are the same, extract number of households per number of terminals that is the number of households for each of the number of household terminals;
a household number estimation section configured to acquire, from a population storage section, information regarding a population in the region within the predetermined range stored in the population storage section in advance of the acquiring by the subscriber information acquisition section, and, by using a terminal subscription rate that is a ratio of the number of the subscribers of the mobile terminals of the specific carrier to the population in the region within the predetermined range to correct the number of households per number of terminals extracted by the household number extraction section, estimate the number of households per number of household members; and
a processing result output section configured to output the number of households per number of household members estimated by the household number estimation section.

2. The household member number distribution estimation apparatus according to claim 1, further comprising the population storage section configured to store therein the information regarding the population in the region within the predetermined range in advance, wherein
the household number estimation section, based on information regarding the population stored in the population storage section and the number of the subscribers of the mobile terminals that is included in the subscriber information acquired by the subscriber information acquisition section, calculates the terminal subscription rate.

3. The household member number distribution estimation apparatus according to claim 1, wherein the household number estimation section, where the number of households per number of terminals is set as $x_j$ when the number of household terminals is set as j, the number of households per number of household members is set as $y_i$ when the number of household members is set as i, and the terminal subscription rate is set as P, by performing operation to obtain $y_i$ that satisfies the following formula (1) based on $x_j$, $$x_j = \sum_{i=j}^{\infty} {}_iC_j P^j (1-P)^{i-j} y_i \quad (1)$$

estimates the number of households per number of household members.

4. The household member number distribution estimation apparatus according to claim 3, wherein the household number estimation section, where a vector having the number of households per number of terminals $x_0, x_1, x_2, \ldots$ as elements of the vector is set as X and a vector having the number of households per number of household members $y_0, y_1, y_2, \ldots$ as elements of the vector is set as Y, when expressing the formula (1) by the following formula (2) using a matrix A, $$X = AY \quad (2)$$

calculates an inverse matrix $A^{-1}$ of the matrix A and, by using the inverse matrix $A^{-1}$ calculated to perform an operation represented in the following formula (3), $$Y = A^{-1} X \quad (3)$$

estimates the number of households per number of household members.

5. The household member number distribution estimation apparatus according to claim 3, wherein the household number estimation section, by performing an operation to obtain $y_i$ that minimizes the following formula (5) based on $x_j$ by a least square method, $$\sum_{j=0}^{\infty} \left( x_j - \sum_{i=j}^{\infty} {}_iC_j P^j (1-P)^{i-j} y_i \right)^2 \quad (5)$$

(condition: $y_i \geq 0$)

estimates the number of households per number of household members.

6. The household member number distribution estimation apparatus according to claim 1, wherein the computer circuitry is further configured to function as a target subscriber extraction section, wherein
the household terminal number extraction section, by referring to the subscriber information and counting the number of the user IDs with which the same household identifier is associated, extracts the number of household terminals for each of the household identifiers, and also stores therein the number of household terminals extracted in association with the household identifiers and the user IDs in the subscriber information,
the target subscriber extraction section, from the subscriber information with which the number of household terminals is associated by the household terminal number extraction section, extracts the subscriber information of the mobile terminals that meet a predetermined subscriber extraction condition stored in advance, and the household number extraction section, by referring to the subscriber information extracted by the target subscriber extraction section and counting the number of household identifiers for which the numbers of household terminals extracted by the household terminal number extraction section are the same for each of the number of household terminals, extracts the number of households per number of terminals.

7. The household member number distribution estimation apparatus according to claim 6, wherein the household number extraction section, by referring to the subscriber information extracted by the target subscriber extraction section and counting the number of the user IDs the household identifiers of which are the same for each of the household identifiers, obtains number of target household terminals that is the number of mobile terminals that belong to a household identified by the household identifier and meet the predetermined subscriber extraction condition, obtains for each household identifier corrected number of target households that is a number obtained by dividing the number of target household terminals by the number of household terminals associated with the household identifier, and extracts the number of households per number of terminals by adding up the corrected numbers of target households for each of the number of household terminals.

8. The household member number distribution estimation apparatus according to claim 6, wherein the computer circuitry is further configured to function as a positional information acquisition section configured to acquire positional information indicating locations of the mobile terminals in association with each of the user IDs, wherein
the subscriber extraction condition is that the subscriber information corresponds the user IDs whose positional information acquired by the positional information acquisition section is contained in a predetermined area.

9. The household member number distribution estimation apparatus according to claim 6, wherein the subscriber information acquisition section obtains subscriber information with which the user IDs, the household identifiers, and user attribute information regarding the users of the mobile terminals are associated, and
the subscriber extraction condition includes that the subscriber information corresponds to the user IDs whose user attribute information of the subscriber information acquired by the subscriber information acquisition section meets a predetermined condition.

10. The household member number distribution estimation apparatus according to claim 9, wherein the user attribute information includes at least one of age, sex, and occupation of the users of the mobile terminals.

11. A household member number distribution estimation method for a household member number distribution estimation apparatus that estimates number of households per number of household members that is the number of households for each number of household members constituting a household in a region within a predetermined range, the household member number distribution estimation method comprising:
performing, by computer circuitry,
a subscriber information acquisition of acquiring subscriber information that is information regarding subscribers of mobile terminals of a specific carrier in the region within the predetermined range and with which user IDs each of which is information for identifying a mobile terminal and household identifiers each of which is information for identifying a household to which a user of the mobile terminal belongs are associated;
a household terminal number extraction of, by referring to the subscriber information acquired at the subscriber information acquisition and counting number of the user IDs with which the same household identifier is associated, extracting number of household terminals that is number of the mobile terminals belonging to the household for each of the household identifiers;
a household number extraction of, by counting number of the household identifiers for which the numbers of household terminals extracted at the household terminal number extraction are the same, extracting number of households per number of terminals that is the number of households for each of the number of household terminals;
a household number estimation of acquiring, from a population storage section, information regarding a population in the region within the predetermined range stored in the population storage section in advance of the subscriber information acquisition, and by using a terminal subscription rate that is a ratio of the number of the subscribers of the mobile terminals of the specific carrier to population in the region within the predetermined range to correct the number of households per number of terminals extracted at the household number extraction, estimating the number of households per number of household members; and
a processing result output of outputting the number of households per number of household members estimated at the household number estimation.

12. The household member number distribution estimation method according to claim 11, further comprising a target subscriber extraction, wherein
the household terminal number extraction, by referring to the subscriber information and counting the number of the user IDs with which the same household identifier is associated, extracts the number of household terminals for each of the household identifiers and also stores therein the number of household terminals extracted in association with the household identifiers and the user IDs in the subscriber information,
the target subscriber extraction, from the subscriber information with which the number of household terminals is associated at the household terminal number extraction, extracts the subscriber information of the mobile terminals that meet a predetermined subscriber extraction condition stored in advance, and
the household number extraction, by referring to the subscriber information extracted at the target subscriber extraction and counting the number of household identifiers for which the numbers of household terminals extracted at the household terminal number extraction are the same, extracts the number of households per number of terminals.

\* \* \* \* \*